(12) United States Patent
Lecheler et al.

(10) Patent No.: US 6,425,008 B1
(45) Date of Patent: Jul. 23, 2002

(54) SYSTEM AND METHOD FOR REMOTE MANAGEMENT OF PRIVATE NETWORKS HAVING DUPLICATE NETWORK ADDRESSES

(75) Inventors: Paul A. Lecheler, Allen; Harold G. Tillinghast, Highland Village, both of TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/250,841

(22) Filed: Feb. 16, 1999

(51) Int. Cl.[7] .................. G06F 15/173; G06F 15/16
(52) U.S. Cl. ............................ 709/224; 709/245
(58) Field of Search ..................... 709/245, 223, 709/224, 295; 714/47

(56) References Cited

U.S. PATENT DOCUMENTS

| | | | |
|---|---|---|---|
| 5,204,955 A | 4/1993 | Kagei et al. | 395/575 |
| 5,768,501 A | 6/1998 | Lewis | 395/185.01 |
| 5,856,974 A | 1/1999 | Gervais et al. | 370/392 |
| 6,000,045 A | * 12/1999 | Lewis | 714/47 |
| 6,006,272 A | * 12/1999 | Aravamudan et al. | 709/245 |
| 6,119,171 A | * 9/2000 | Alkhatib | 709/245 |

OTHER PUBLICATIONS

Tsuchiya, Paul F., et. al.: "Extending the IP Internet Through Address Reuse", Computer Communications Review, US, Association for Computing Machinery. New York, vol. 1, No. 23, 1 Jan. 1993, pp. 16–33.

* cited by examiner

Primary Examiner—Dung C. Dinh
Assistant Examiner—Tod Kupstas
(74) Attorney, Agent, or Firm—Baker Botts LLP

(57) ABSTRACT

A system for remote management of private networks having duplicate network addresses is provided which consists of a plurality of managed customer networks (16) within a customer domain (12). The managed customer networks (16) within the customer domain (12) are linked to a level one manager (34) and have unique network addresses. The managed customer networks (16) within the customer domain (12) which have duplicate network addresses are assigned to different level one managers. Errors occurring in the managed customer networks are sent to a level one manager (34) which generates an error message uniquely identifying the node or interface link experiencing the error. This error message is forwarded to a level two manager (40) which then routes the error message to an appropriate operator console (42) where the error is diagnosed and corrected.

20 Claims, 4 Drawing Sheets

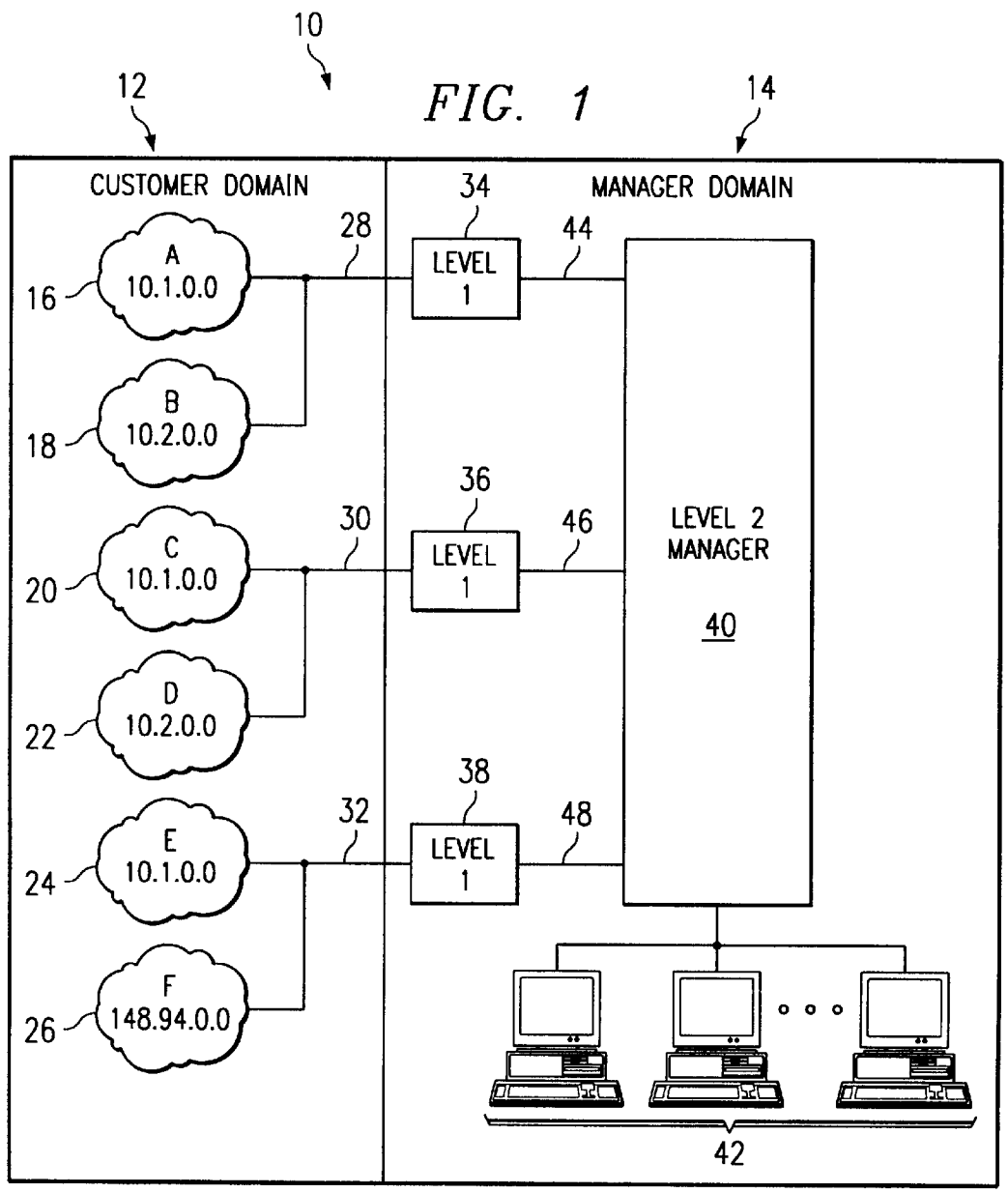

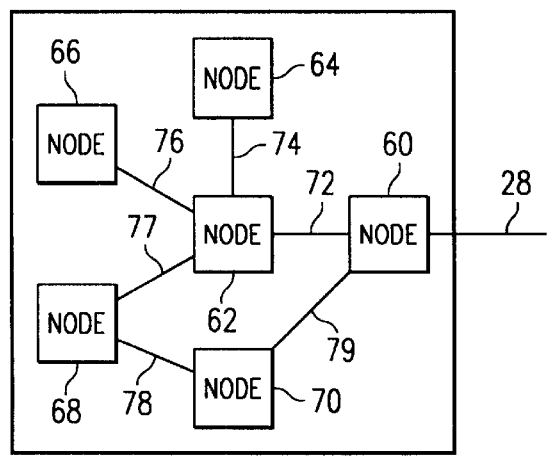
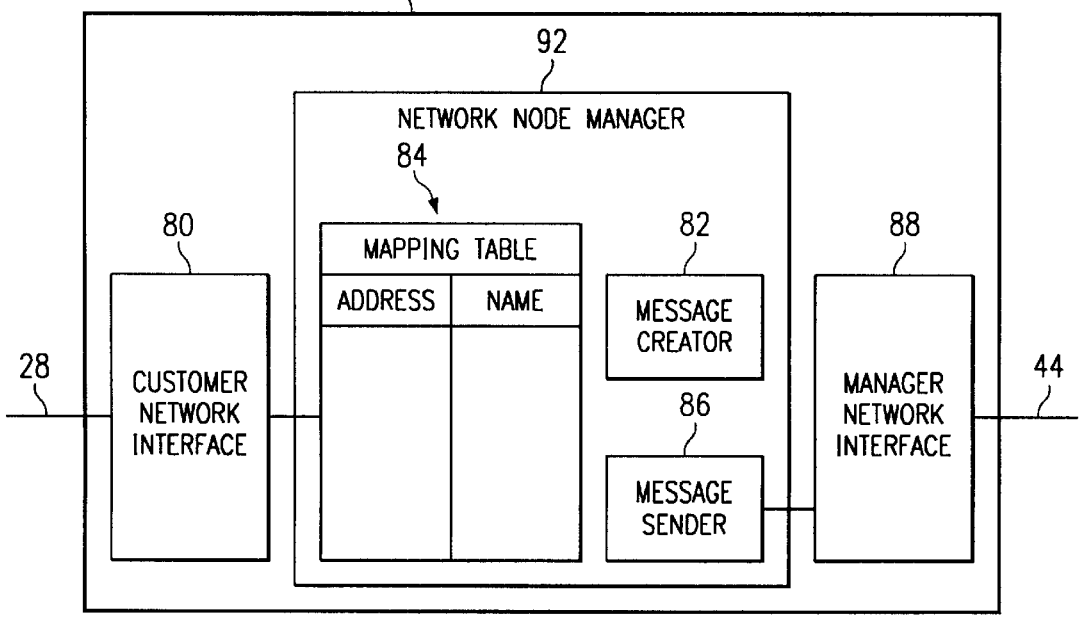

SYSTEM AND METHOD FOR REMOTE MANAGEMENT OF PRIVATE NETWORKS HAVING DUPLICATE NETWORK ADDRESSES

TECHNICAL FIELD OF THE INVENTION

This invention relates in general to the field of management of computer networks, and more particularly to a system and method for remote management of private networks having duplicate network addresses.

BACKGROUND OF THE INVENTION

The Internet is a worldwide network interconnecting computers around the globe. In order to be connected to the Internet, every computer must have a unique address so that communications and data can be transferred to a specific device. In computer networks, a computer is also known as a node. Nodes can be any device which transmits or receives data or instructions across the computer network. Since every computer, or node, within a computer network must have a unique address, the organizers of the Internet developed an addressing scheme referred to as Internet Protocol (IP) addressing. An Internet Protocol address is 32 bits wide and is written as w.x.y.z. Each letter w, x, y, and z, represents eight bits of the address and has a range of 0 to 255. Connections to the Internet have grown at an incredible rate such that available IP addresses are quickly running out.

Computer networks which are attached to the Internet are referred to as "public" networks, and they must have a globally unique IP address which is registered with an organization responsible for allocating available IP addresses. A computer network which will not be connected to the Internet and is intended only for the internal use of the network owner is referred to as a "private" network. A private network must maintain unique network addresses within its own network. However, private networks are not concerned with network addresses outside of the private network. With the increased popularity of Internet Protocol for computer networks, many private networks have adopted the IP address scheme to assign addresses to their network nodes.

The Internet Assigned Numbers Authority has reserved the following three blocks of the IP address space for private networks:

10.0.0.0–10.255.255.255
172.16.0.0–172.31.255.255
192.168.0.0–192.168.255.255

These reserved blocks of IP address space will not be used by any node connected to a public network. The purpose for reserving blocks of the IP address space is so that private networks can use the IP address scheme without having to register their IP address space. In addition, the reservation of IP address space for private networks avoids the use of public IP address space for networks which will not be connected to the Internet. By using the reserved IP address space, addresses within the private network will only be unique within that network.

When a private network elects to use the IP addressing scheme, it must choose a block of addresses for its network. Many private networks have chosen a beginning network address equal to one of the low blocks of IP address space such as 10.1.0.0. Thus, many private networks have duplicate network addresses among or between them.

With the increase in the number of computer networks throughout the business and corporate world, many businesses have realized that the management of information technology infrastructure can be a difficult and time consuming task. These companies are electing to contract with a third party network management company to provide private network management services. When a private network management company begins to manage several private networks, it is probable that two or more of the managed private networks may utilize duplicate IP address space. Thus, devices, or nodes, within the managed private network do not necessarily have a unique network address. Duplicate network addresses make it difficult to uniquely identify the source of an error message. Operators responding to error messages must first determine from which of several networks having duplicate network addresses the error came. This increases the time necessary to identify and correct network errors occurring in managed networks.

One solution to the problem of duplicate network addresses is to renumber the duplicate IP address space so that unique IP addresses are obtained. However, this can be expensive, time consuming, and disruptive to the private network owner. Another solution to the problem of duplicate network addresses is to maintain a separate management system for each managed private network having a duplicate IP address space. This results in many computer terminals and duplicative amounts of equipment. This has proved unworkable as the number of managed private networks having duplicate address space has grown.

Due to the aforementioned problems, current methods of remotely managing private networks having duplicate network addresses require excessive equipment, infrastructure, and staff in order to ensure that an error can be uniquely identified as originating in a specific managed private network. Therefore, it is desirable to provide a technique to manage multiple, private networks with duplicate network addresses without excessive amounts of equipment.

SUMMARY OF THE INVENTION

From the foregoing, it may be appreciated that a need has arisen for an improved system and method for remote management of private networks having duplicate network addresses. In accordance with the present invention, a system and method for remote management of private networks having duplicate network addresses are provided which substantially eliminate or reduce disadvantages and problems associated with conventional techniques for maintaining private networks with duplicate network addresses.

According to one embodiment of the present invention, there is provided a level one manager linked to a plurality of managed customer networks. The level one manager monitors the managed customer networks and detects errors which may occur in the managed customer networks. Upon detecting an error, the level one manager generates an error notice which contains a unique identifier for the device which experienced the error. The error notice is sent to a level two manager which routes the error notice to an appropriate operator console.

The present invention provides various technical advantages over current systems and methods of handling duplicate network addresses within managed private networks. For example, one technical advantage is to eliminate the need for separate management systems for managed private networks with duplicate network addresses. In addition, another technical advantage is little disruption to the private network as compared to techniques that renumber the private network in order to obtain unique network addresses. Another advantage is to reduce the time needed to identify a problem and to reduce the time needed to restore service at the managed customer network experiencing a problem. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which:

FIG. 1 is a block diagram illustrating a customer domain and a connection to a manager domain;

FIG. 2 is a block diagram illustrating a typical organization of a managed customer network;

FIG. 3 is a block diagram illustrating a level one manager;

DETAILED DESCRIPTION OF THE DRAWINGS

Figure 4A:
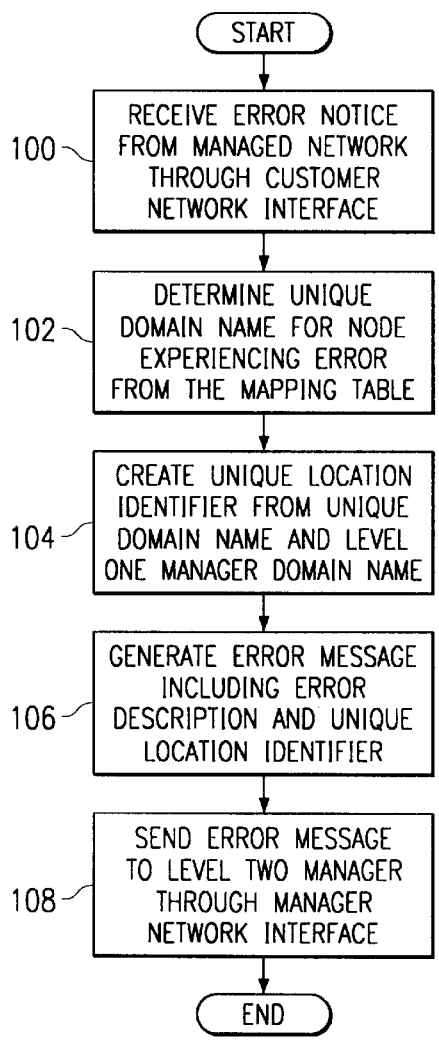
FIGS. 4a and 4b are flow diagrams illustrating the process of detecting errors within the managed customer network and generating error messages.

Referring to FIG. 1, a managed network domain is generally indicated at 10. Managed network domain 10 encompasses a customer domain 12 and a network manager domain 14. Customer domain 12 consists of any number of managed customer networks. The managed customer networks may utilize any network addressing scheme. Among the more common network addressing schemes is Internet Protocol (IP) addressing.

A managed customer A network 16 has an IP address space beginning with 10.1.0.0. A managed customer B network 18 has an IP address of 10.2.0.0. Thus, managed customer A network 16 and managed customer B network 18 have unique network addresses. A managed customer C network 20 has an IP address of 10.1.0.0. A managed customer D network 22 has an IP address of 10.2.0.0. Managed customer C network 20 has an IP address space which is the same as managed customer A network 16, and managed customer D network 22 has the same IP address space as managed customer B network 18. Thus, customer domain 12 has duplicate network addresses which are managed by the third party network manager which operates network manager domain 14. A managed customer E network 24 has an IP address of 10.1.0.0. Thus, managed customer E network 24 uses the same network address space as managed customer A network 16 and managed customer C network 20. A managed customer F network 26 has an IP address of 148.94.0.0. Managed customer F network 26 has a globally unique network address space since its address space falls within the globally unique addresses which must be registered with the appropriate address space registration authority.

Network manager domain 14 consists of several level one managers. A level one manager is responsible for monitoring a group of managed customer networks which have unique network addresses. Thus, two managed customer networks which use the same network address space are preferably not connected to the same level one manager. Therefore, managed customer A network 16 and managed customer B network 18 are connected to a level one manager 34 via line 28. Managed customer C network 20 and managed customer D network 22 are connected to a level one manager 36 via line 30. Managed customer E network 24 and managed customer F network 26 are connected to a level one manager 38 via line 32. Line 28, line 30, and line 32 may include any one or a combination of an integrated services digital network (ISDN) communications line. A hard-wire line, a fiber-optic line, a telephone link, or any other suitable means for communicating between the managed customer networks and the level one manager. Since managed customer F network has a globally unique network address space, it could be connected to any level one manager without regard to duplication of network address space. In the sample network illustrated in FIG. 1, the minimum number of level one managers necessary is three since there are three managed customer networks which share the same IP address space.

The level one managers are responsible for detecting errors which occur within the customer domain 12. The level one managers act as an application server for network node management software and may consist of any suitable computer type device. For example, level one manager 34 may be a personal computer, a mainframe computer, or any other suitable computer device. The network node management software monitors the managed customer networks and reports errors to the level one manager. When an error occurs on a managed customer network, the managed customer network may send an error message to the level one manager to which it is connected. The level one manager may also query its managed customer networks to determine if all nodes within the network are functioning properly. If a level one manager receives an error message from a managed customer network or detects an error condition within a managed customer network, it generates an error message which uniquely identifies both the location of the error and the level one manager which is responsible for monitoring that managed customer network. By limiting the customer domain linked to a level one manager to managed customer networks with unique network addresses, the present invention realizes faster identification of managed customer network errors and faster restoration of service as compared to network management systems which do not handle duplicate network addresses.

The error message produced by the level one manager may contain a description of the error as well as a unique location identifier. If the network address of the node within customer domain 12 which experienced the error is used to identify the node, it may not be unique due to the existence of duplicate network addresses within customer domain 12. In order to construct a unique location identifier for the node experiencing the error, the network address of the node is converted into a unique location identifier. The first half of the unique location identifier may include the managed customer network interface, the managed customer network node, the managed customer network domain name, and the managed customer domain location. The second half of the unique location identifier may come from the domain name of the level one manager generating the error message. This domain name may consist of the level one manager domain name and a level two manager domain name. The two halves of the unique location identifier may be separated by a semicolon or other delimiter. A sample format of a unique location identifier could be "customer_interface.customer_ node.customer_domain. customer location; L1_mgr_ name. L2_mgr_name". By focusing on the domain name of the managed device experiencing an error instead of the network address, unique identification of the managed device can be obtained.

Referring again to FIG. 1, level one manager 34, level one manager 36, and level one manager 38 are coupled to a level two manager 40. Level one manager 34 is coupled to level two manager 40 by a link 44. Level one manager 36 is coupled to level two manager 40 by a link 46. Level one manager 38 is coupled to level two manager 40 by a link 48. Level two manager 40 may consist of a personal computer, a mid-range computer, a mainframe computer, or any suitable computer type processing device. Level two manager 40 is responsible for receiving an error message and routing it to an appropriate operator console 42. Level two manager 40 determines to which operator console 42 to route the error message based on what operators are signed on to which operator consoles. Level two manager 40 accomplishes this by running a message switching software application. Thus, level two manager 40 may route certain error messages to a first operator while routing different error messages to a second operator. By doing this, the operators most familiar with specific network errors will receive the error message and correct the problem.

Referring to FIG. 2, an exemplary organization of managed customer A network 16 is shown. The organization of the other managed customer networks may be similar. Managed customer A network 16 is coupled to level one manager 34 via line 28. Within managed customer A network 16 are several nodes, node 60, node 62, node 64, node 66, node 68, and node 70. A node may be a router, a switch, a hub, a server, a computer, a printer, or some other device connected to managed customer A network 16. Managed customer A network 16 also contains several interface links, interface link 72, interface link 74, interface link 76, interface link 77, interface link 78, and interface link 79. Interface links generally connect devices, or nodes, and may consist of an electrical connection, a software connection, or some other type of connection. Errors occurring in managed customer A network 16 may occur in the nodes or in the interface links to and between those nodes.

Referring to FIG. 3, level one manager 34 is shown illustrating the general structure of a level one manager within the present invention. Level one manager 34 has two network interfaces, a customer network interface 80 and a manager network interface 88. Customer network interface 80 is coupled to managed customer A network 16 and managed customer B network 18 via line 28. Customer network interface 80 allows managed customer A network 16 and level one manager 34 to communicate. Managed customer A network 16 only has knowledge of level one manager 34. It does not have knowledge of level two manager 40 since managed customer A network 16 cannot communicate directly with level two manager 40. Line 28 is the communications link between level one manager 34 and all managed customer networks managed by level one manager 34.

Managed customer A network 16 may experience an error and forward an error notice to level one manager 34. When customer network interface 80 receives the error notice, it forwards it to a network node manager 92. Network node manager 92 may be a software application which monitors the managed customer networks assigned to level one manager 34. Monitoring of managed customer networks includes receiving error notices from managed customer networks, periodically querying managed customer networks to locate unreported error conditions, and interacting with managed customer networks to diagnose and correct errors. The error notice received by network node manager 92 may contain a description of the error and the network address of the node or interface link which experienced the error. Network mode manager 92 has a mapping table 84 which converts the network address into a unique domain name. Mapping table 84 is separately maintained and contains a list of all network addresses connected to level one manager 34 and a unique domain name for each of those network addresses.

Network node manager 92 contains a message creator 82 which generates an appropriate error message with a unique location identifier and a description of the error. The unique location identifier consists of the unique domain name obtained from mapping table 84 and the domain name of level one manager 34. One possible format of the unique location identifier has been previously discussed with reference to FIG. 1.

After mapping the network address to a unique domain name and generating a unique location identifier, message creator 82 has ensured that there are no duplicate network addresses sent to level two manager 40. Focusing on unique domain names instead of network addresses eliminates the potential for duplicate network addresses being sent to level two manager 40. Sending a duplicate network address to level two manager 40 would increase the network manager's response times since all duplicate locations within customer domain 12 would have to be checked for an error condition. Thus, the advantages of the present system include reducing the time necessary to respond to an error and reducing the time necessary to correct the error.

After message creator 82 formats an error message, message sender 86 interfaces with manager network interface 88 in order to send the error message to level two manager 40 via link 44. Manager network interface 88 allows level one manager 34 and level two manager 40 to communicate. The use of customer network interface 80 and manager network interface 88 effectively creates a wall between customer domain 12 and network manager domain 14. This wall prevents level two manager 40 from communicating directly with the managed customer networks. It also prevents the managed customer networks from accessing level two manager 40. Thus, the level one managers act as a gateway between the customer domain and the manager domain and ensures that level two manager 40 does not receive duplicate network address messages. Customer network interface 80 and manager network interface 88 may be network interface cards installed in level one manager 34.

Level one manager 34 may also detect error conditions existing in the managed customer networks to which it is linked by periodically sending queries to each node and interface link in each managed customer network. These queries can detect both error conditions and conditions which are not yet errors but which may be problematic to the successful operation of the managed customer network. Network node manager 92 performs the functions of periodically sending out queries to the managed customer networks. If an error condition is returned to network node manager 92, network node manager 92 forwards the error condition to message creator 82 which then generates an appropriate error message to be sent to level two manager 40.

Another function of network node manager 92 is to initiate a correction session with the node or interface link which experienced the error. When an operator receives an error message on operator console 42, the operator has the unique location identifier which uniquely identifies the node or interface link which experienced the error. The operator utilizes the level one manager identifier and level two manager identifier in order to locate the appropriate level one manager. Upon locating the proper level one manager, mapping table 84 is used to convert the unique domain name received in the error message to a network address so network node manager 92 can initiate a session with the appropriate network address. Network node manager 92 may be used to diagnose the error, correct the error, and verify that the node or interface link is up and operational.

FIG. 4a is a flow diagram that illustrates the process of level one manager 34 detecting an error on a managed customer network by receiving an error notice generated by a managed customer network. The process begins at step 100 where level one manager 34 receives an error notice from a managed customer network through customer network interface 80. The error notice may be generated by a managed customer network which has a node which experienced an error. The process proceeds to step 102 where network node manager 92 determines a unique domain name for the node experiencing the error by using mapping table 84. The process then proceeds to step 104 where network node manager 92 creates a unique location identifier from the unique domain name and the domain name for level one manager 34. The process then proceeds to step 106 where message creator 82 generates an error message which includes a description of the error and the unique location identifier. It is understood that the determination of the unique domain name and the creation of the unique location identifier could be performed by message creator 82. The process then proceeds to step 108 where message sender 86 sends the error message to level two manager 40 through manager network interface 88.

Figure 4B:
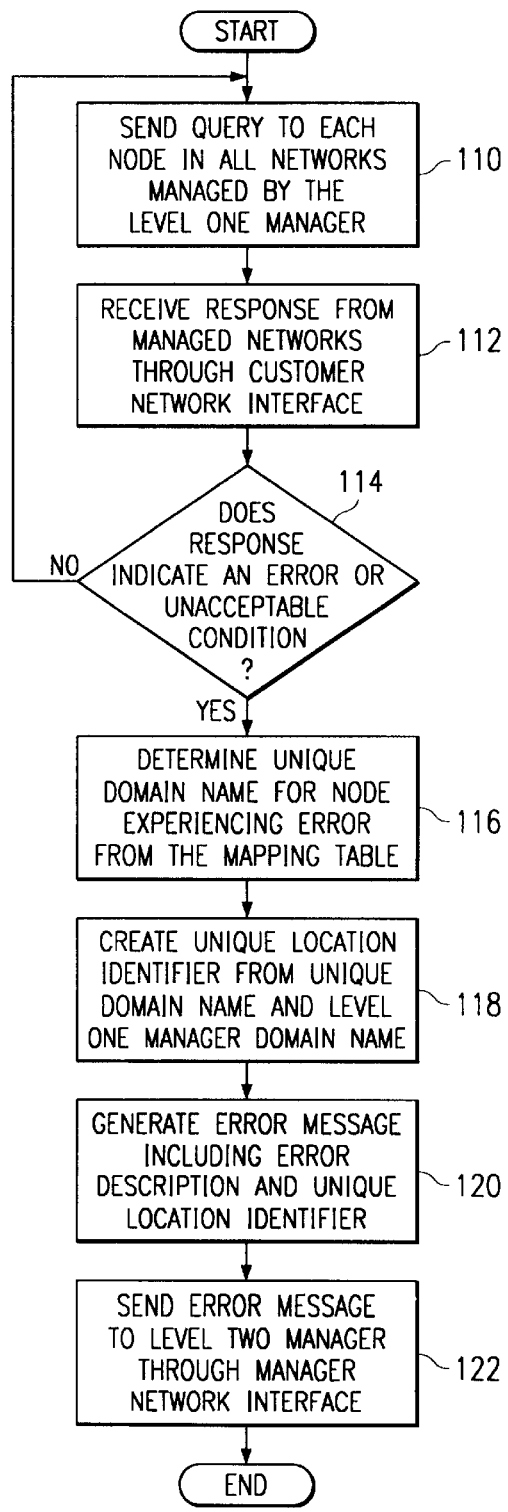

FIG. 4b is a flow diagram that illustrates the process of network node manager 92 within level one manager 34 periodically querying nodes within the managed customer networks to determine if error conditions are present. The process begins at step 110 where network node manager 92 sends a query through customer network interface 80 to each node in all customer networks managed by level one manager 34. The process then proceeds to step 112 where network node manager 92 receives a response to its query through customer network interface 80. The process then proceeds to step 114 where a determination is made regarding whether the received response indicates an error condition or an unacceptable condition on a network node within one of the managed customer networks. If no error or unacceptable condition is indicated, the process returns to step 110 to await the next scheduled query of the managed customer networks. If step 114 indicates that an error condition or unacceptable condition exists, the process proceeds to step 116 where network node manager 92 determines a unique domain name for the node experiencing the error or unacceptable condition using mapping table 84. The process then proceeds to step 118 where network node manager 92 creates a unique location identifier from the unique domain name and the domain name of level one manager 34. The determination of the unique domain name and creation of the unique location identifier may be performed by either network node manager 92 or message creator 82. The process then proceeds to step 120 where message creator 82 generates an error message which includes a description of the error condition and the unique location identifier. The process then proceeds to step 122 where message sender 86 sends the error message to level two manager 40 through manager network interface 88.

Figure 5:
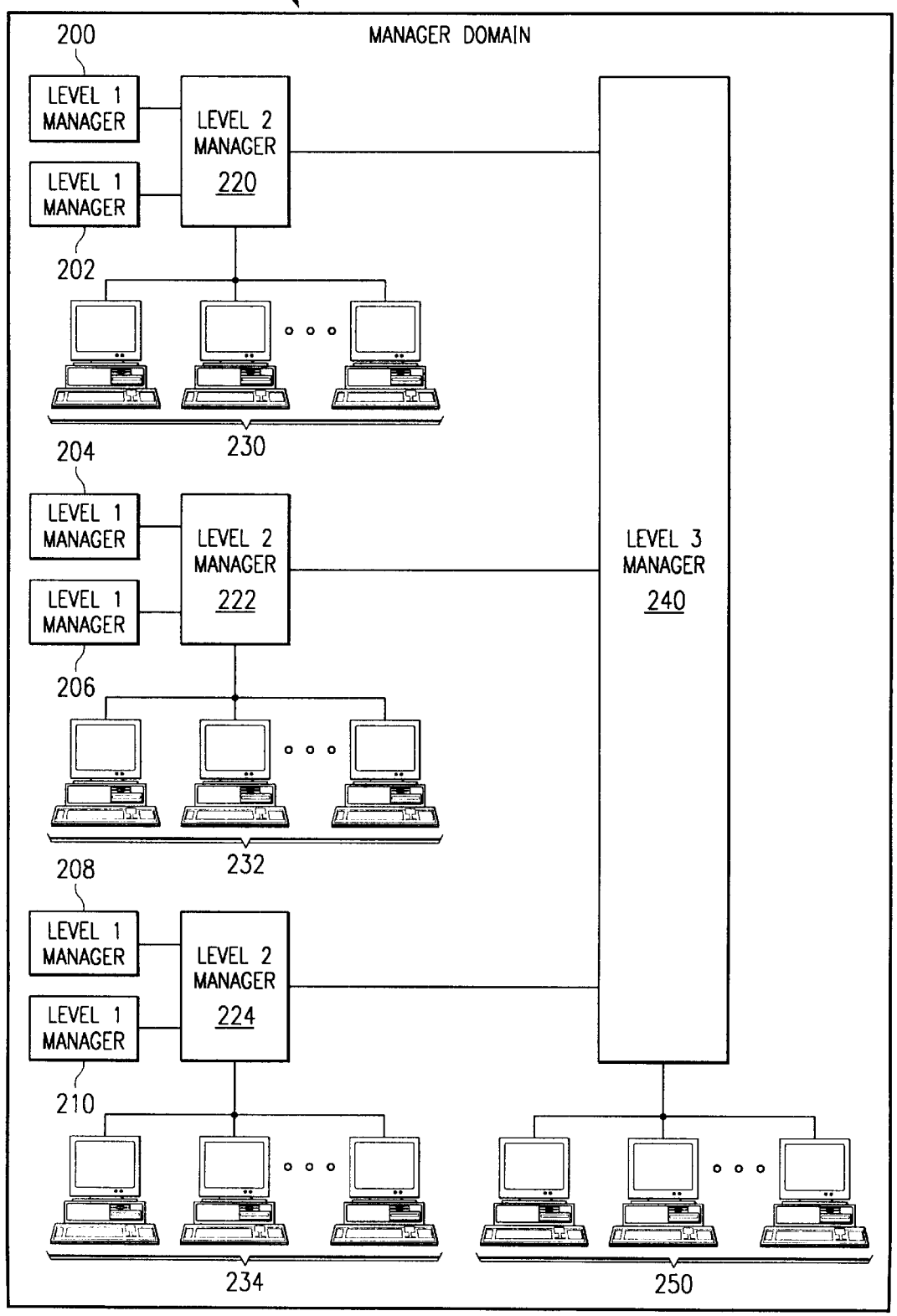
FIG. 5 is a block diagram illustrating multiple levels of network managers.

Referring to FIG. 5, a view of network manager domain 14 is shown which has multiple levels of level two managers. This example illustrates that several levels of level two managers can be used in order to more easily manage a large number of managed customer networks in customer domain 12. In this example, network manager domain 14 contains six level one managers, a level one manager 200, a level one manager 202, a level one manager 204, a level one manager 206, a level one manager 208, and a level one manager 210. In order to more easily manage the managed customer networks linked to each level one manager, the level one managers within network manager domain 14 may be organized geographically. Other possible organizations may be used such as organization by industry or complexity of network. If the level one managers are organized geographically, then the three level two managers, a level two manager 220, a level two manager 222, and a level two manager 224, may represent United States, South America, and Asia. Level two manager 220 may have a number of local operator consoles 230, level two manager 222 may have a number of local operator consoles 232, and level two manager 224 may have a number of local operator consoles 234.

Another level two manager may be added as another management level above the three level two managers. In this case, the next level two manager is referred to as a level three manager 240, but its basic functions are the same as previously described for level two manager 40. Level three manager 240 has a number of operator consoles 250 coupled to it. The operation of this exemplary system is the same as that previously discussed in this specification except that level two manager 220, level two manager 222, and level two manager 224 may route some error messages to their attached local operator consoles and other error messages to level three manager 240. When level three manager 240 receives an error message, it routes the error message to one of operator consoles 250. One possible use for this exemplary organization is to have experts in more difficult network errors located at a central network management center which contains level three manager 240 and operator consoles 250. Therefore, all error messages of this type received by any of the level two managers would be forwarded to level three manager 240. Other error messages received by the level two managers could be routed to local operator consoles since those errors may be either routine or unique to the managed customer networks. Any number of management levels may be created for this inventive system. Each additional layer of management may consist of one or more additional level two managers.

It is apparent that there has been provided in accordance with the present invention, an improved system and method for remote management of private networks having duplicate network addresses which satisfies the advantages set forth above. Although the present invention and its advantages have been described in detail, it should be understood that various changes, substitutions, and alterations readily apparent to those skilled in the art may be made herein without departing from the spirit and the scope of the present invention as defined by the following claims.

What is claimed is:

1. A system for remote management of private networks having duplicate network addresses, comprising:

a plurality of customer networks, each customer network having devices with unique domain names but identical network addresses as devices in others of the plurality of customer networks;

a plurality of level one managers linked to the plurality of customer networks wherein each level one manager is linked to a group of customer networks having devices with unique network addresses, each of the plurality of level one managers having a domain name and network address associated therewith, the plurality of level one managers operable to monitor the plurality of customer networks for error conditions and to generate an error message including a location identifier uniquely identifying the device which experiences an error condition despite the device having an identical network address as devices in other groups of customer networks, the unique location identifier including the unique domain name of the device experiencing the error condition and the domain name of the level one manager associated with the device having the error condition; and a level two manager linked to the plurality of level one managers, the level two manager operable to receive the error messages and route the error messages to an operator console.

2. The system of claim 1, wherein each level one manager includes a network interface linked to the group of customer networks and a network interface linked to the level two manager.

3. The system of claim 1, wherein the network address is an Internet Protocol address.

4. The system of claim 1, wherein each level one manager includes a network monitor operable to detect device errors occurring within the group of customer networks to which the level one manager is linked.

5. The system of claim 4, wherein the network monitor is further operable to start a session using the location identifier in the error message to locate the device experiencing the error, the network monitor further operable to diagnose and correct the error.

6. The system of claim 4, wherein the network monitor is further operable to receive an error notice from the group of customer networks and to query the group of customer networks for a status of a device within the group of customer networks.

7. The system of claim 5, wherein the level two manager is further operable to initiate a session through the network monitor in a level one manager.

8. The system of claim 1, wherein each level one manager further includes a message sender operable to send the error message to the level two manager.

9. The system of claim 1, wherein each level one manager includes a message formatter operable to format an error message containing a location identifier for the device experiencing the error.

10. The system of claim 9, wherein each level one manager includes a mapper operable to convert a network address of the device experiencing the error into its unique domain name.

11. The system of claim 10, wherein the unique domain name includes a customer interface identifier, a customer node identifier, a customer domain name, and a customer location identifier.

12. The system of claim 10, wherein the location identifier includes the unique domain name of the device experiencing the error and a domain name of the level one manager formatting the message, the domain name of the level one manager including a level one manager identifier and a level two manager identifier.

13. A gateway for monitoring customer networks and generating error messages for customer networks, comprising:

a first network interface linked to a plurality of customer networks;

a network monitor operable to detect errors occurring on one of the plurality of customer networks;

a mapper operable to convert the network address of a device experiencing an error into a unique domain name;

a message formatter operable to format an error message containing the unique domain name of the device experiencing the error and a domain name of the gateway formatting the message;

a second network interface linked to a level two manager; and a message sender operable to send the error message to the level two manager through the second network interface.

14. The gateway of claim 13, wherein the unique domain name includes a customer interface, a customer node, a customer domain name, and a customer location identifier.

15. The gateway of claim 13, wherein the network monitor is further operable to initiate a session with the device identified in the error message, the network monitor further operable to diagnose and correct the error.

16. The gateway of claim 13, wherein the network monitor is further operable to receive an error notice from one of the plurality of customer networks and to query the plurality of customer networks for a status of a device within the plurality of customer networks.

17. A method for remote management of private networks having duplicate network addresses, comprising:

monitoring a plurality of customer networks wherein two or more of the customer networks have duplicate network addresses;

detecting an error condition occurring on a device within one of the plurality of customer networks;

determining a unique domain name for the network address of the device experiencing the error;

formatting an error message containing a description of the error condition, the unique domain name, and a domain name of a level one manager generating the error message;

sending the error message from the level one manager to a level two manager; and routing the error message from the level two manager to an operator console.

18. The method of claim 17, wherein detecting an error condition includes receiving an error notice from the device within one of the plurality of customer networks which experiences the error condition.

19. The method of claim 17, wherein detecting an error condition includes querying each of the plurality of customer networks for a status of a device within each of the plurality of customer networks.

20. The method of claim 17, wherein determining a unique domain name includes mapping a network address of the device experiencing the error to a unique domain name stored in a domain name mapping table.

* * * * *